United States Patent

Luginbühl

[11] 3,904,077
[45] Sept. 9, 1975

[54] APPARATUS FOR SEPARATELY DISCHARGING ARTICLES

[75] Inventor: Pierre Luginbühl, Neuhausen am Rheinfall, Switzerland

[73] Assignee: S I G Schweizerische Industrie-Gesellschaft, Neuhausen am Rheinfall, Switzerland

[22] Filed: Oct. 2, 1974

[21] Appl. No.: 511,494

[30] Foreign Application Priority Data
Oct. 2, 1973 Switzerland............... 14072/73

[52] U.S. Cl. ............ 221/175; 221/225; 221/232; 221/262; 214/6 R; 214/8.5 A; 271/3.1; 271/181
[51] Int. Cl.² ........................................ B65G 60/00
[58] Field of Search ............ 221/66, 175, 224, 225, 221/226, 230, 232, 243, 251, 279, 280, 311, 262, 208; 214/6 R, 8.5 R, 8.5 A, 8.5 K; 271/3.1, 18, 149, 180, 181, 214

[56] References Cited
UNITED STATES PATENTS

| | | | |
|---|---|---|---|
| 2,522,896 | 9/1950 | Rifkin et al.............. | 221/279 X |
| 2,557,181 | 6/1951 | Flack...................... | 221/175 X |
| 3,193,139 | 7/1965 | Iannone et al.......... | 221/251 X |
| 3,767,084 | 10/1973 | Bayha...................... | 221/279 |

FOREIGN PATENTS OR APPLICATIONS

| | | | |
|---|---|---|---|
| 1,021,381 | 12/1957 | Germany................. | 271/181 |

*Primary Examiner*—Robert B. Reeves
*Assistant Examiner*—Joseph J. Rolla
*Attorney, Agent, or Firm*—Spencer & Kaye

[57] ABSTRACT

An apparatus for separately discharging articles has a compacting channel; a charging plate disposed at the inlet end of the compacting channel and moving towards and away from the compacting channel for sequentially introducing articles thereinto with a simultaneous, intermittent feed of all articles in the compacting channel; and a retaining member reciprocated at the discharge end of the compacting channel in coordination with the movement of the charging plate. The retaining member is in engagement and travels with the leading article in the compacting channel and releases the leading article at the end of the intermittent feed in the compacting channel.

12 Claims, 8 Drawing Figures

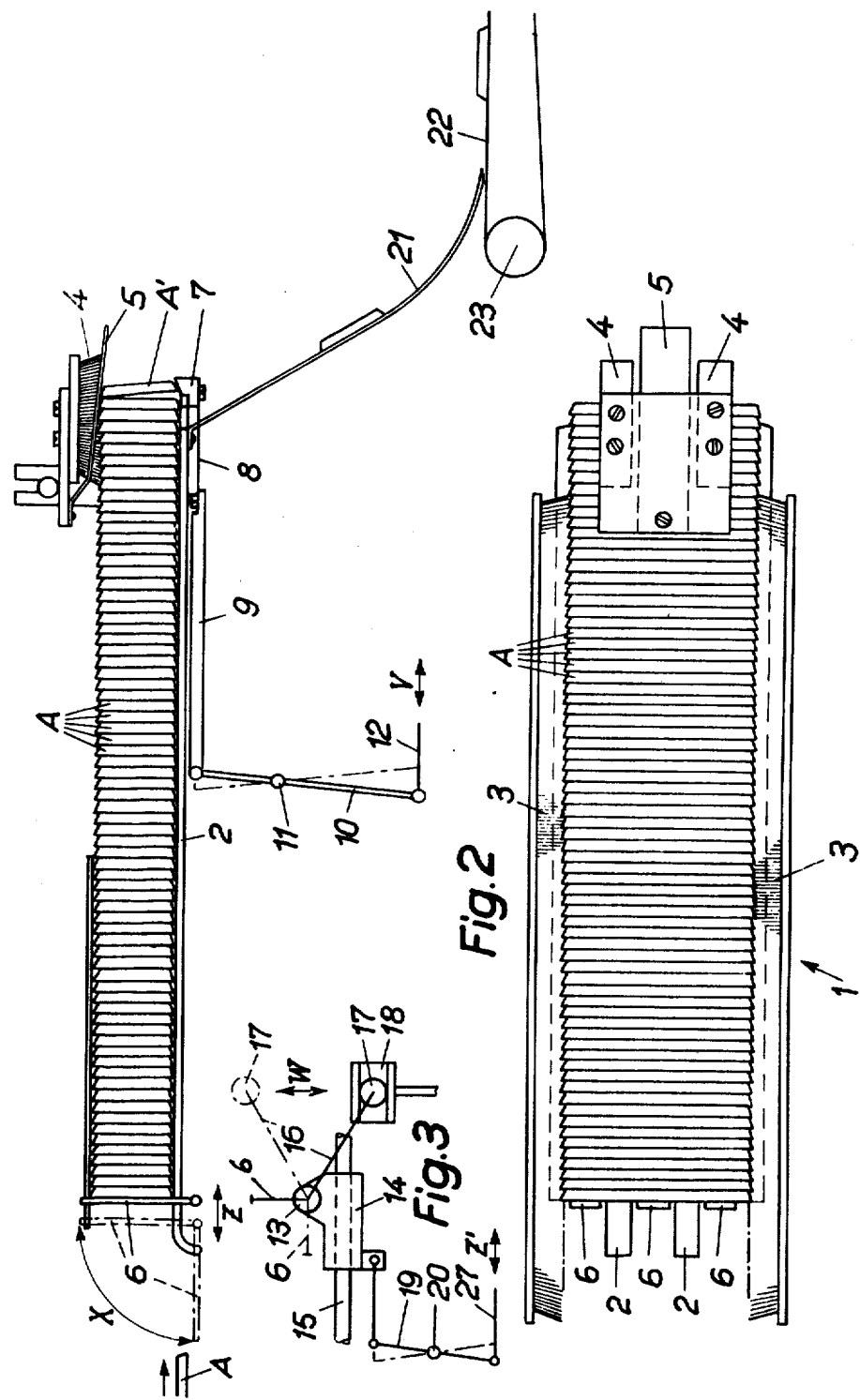

APPARATUS FOR SEPARATELY DISCHARGING ARTICLES

BACKGROUND OF THE INVENTION

This invention relates to an apparatus for separately discharging articles, particularly wrapped chocolate bars, from an at least approximately horizontally arranged compacting channel. The articles are introduced into the compacting channel at its input side intermittently by means of a charging plate which executes a reciprocating movement towards and away from the channel.

Apparatuses of the above-outlined type are known. The articles are sequentially placed into the compacting channel by means of the charging plate and are, simultaneously, slightly advanced so that each time an article is introduced into the compacting channel, at the discharge end thereof at least one article is ejected, for example, onto a chute that leads to a conveyor belt. In case the individual articles stand edge-wise and form a horizontally oriented series, it is often difficult to accomplish a satisfactory separation of the articles at the discharge end of the compacting channel, particularly if the already wrapped articles are springingly urged to one another.

SUMMARY OF THE INVENTION

It is an object of the invention to provide an apparatus of the above-outlined type in which a highly reliable separation of the articles emerging from the compacting channel may be accomplished by simple means.

It is a further object of the invention to provide an apparatus of the above-outlined type in which a highly reliable separation of articles may be effected even if the compacting channel is relatively long and the throughput of the apparatus is relatively large and further, even if the articles display certain irregularities.

These objects and others to become apparent as the specification progresses, are accomplished by the invention, according to which, briefly stated, along the bottom of the compacting channel, at the discharge end thereof, there is provided a retaining member reciprocating in the direction of the channel; the movement of the retaining member is coordinated with that of the charging plate that introduces the articles into the compacting channel.

Expediently, the retaining member is supported on a spring element such as a leaf spring. Further, the retaining member expediently has a wedge-shaped projection which extends, in the position of rest, beyond the surface of the channel bottom.

BRIEF DESCRIPTION OF THE DRAWINGS

FIG. 1 is a schematic side elevational view of a preferred embodiment of the invention.

FIG. 2 is a top plan view of the same embodiment.

FIG. 3 is a schematic side elevational view of a drive mechanism for a component forming part of the preferred embodiment.

DESCRIPTION OF THE PREFERRED EMBODIMENT

Figure 4:
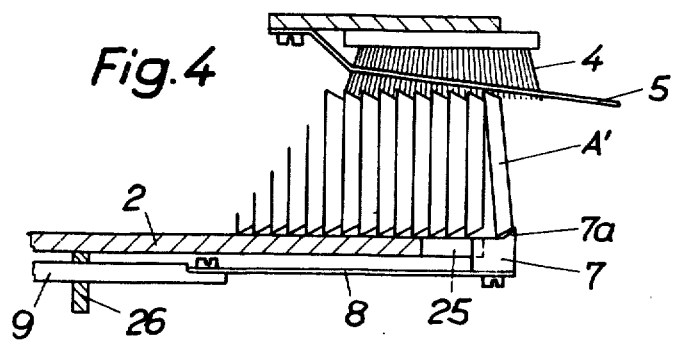
FIGS. 4, 5 and 6 are schematic side elevational views of a part of the preferred embodiment in three different operational positions.

Turning now to FIGS. 1 and 2, first the conventional components of the apparatus will be described. The apparatus includes a compacting channel 1 provided with a base plate 2 constituting the channel bottom. The flat articles, such as chocolate bars A stacked in a face-to-face upright position on the base plate 2, are laterally supported by two brushes 3 which extend along the base plate 2 and stop short of the discharge end of the channel 1. Directly above the discharge end of the base plate 2 there are arranged two further brushes 4 between which there is positioned a leaf spring 5.

The individual chocolate bars A are, by means of a conveying device not illustrated, forwarded onto a charging plate 6 which, as indicated by the double-headed arrow X, executes a swinging motion of 90° and simultaneously performs, as indicated by the double-headed arrow Z, a reciprocating motion in the longitudinal direction of the compacting channel 1. By virtue of this motion of the charging plate 6, each time an article A is introduced into the compacting channel 1, simultaneously the entire series of articles in the compacting channel is shifted slightly towards the discharge end thereof, so that, as a result, at the discharge end of the compacting channel one article is ejected which falls onto a chute 21 leading to a conveyor belt 22 supported by a drive roller 23. The articles A are laterally supported by the brushes 3 as the former pass through the compacting channel 1.

The drive for the charging plate 6 is schematically illustrated in FIG. 3. The charging plate 6 is supported on a carriage 14 by means of a pivot pin 13. The carriage 14, in turn, is movable back and forth on a guide rail 15 in the longitudinal direction. The carriage 14 is connected to one end of a two-armed lever 19 pivotally attached at 20. To the other end of the lever 19 there is connected an actuating rod 27 which reciprocates in the direction Z' and thus causes an oscillating motion of the lever 19 about pivot 20. The rod 27 is moved, for example, by a contoured cam disc. A rotary shaft 13 supported in the carriage 14 is connected with a lever 16 which, at its free end, carries a roller 17. The latter, in turn, projects into a sleeve joint 18 which is reciprocated, for example, by a contoured cam disc in a vertical direction as indicated by the double-headed arrow W. In this manner, to the charging plate 6 there is imparted the above-described swinging motion with simultaneous reciprocating motion in the direction of the compacting channel 1.

The structure of the apparatus described so far is conventional. The improvement according to the invention resides in the design of the discharge end of the compacting channel 1.

Figure 5:
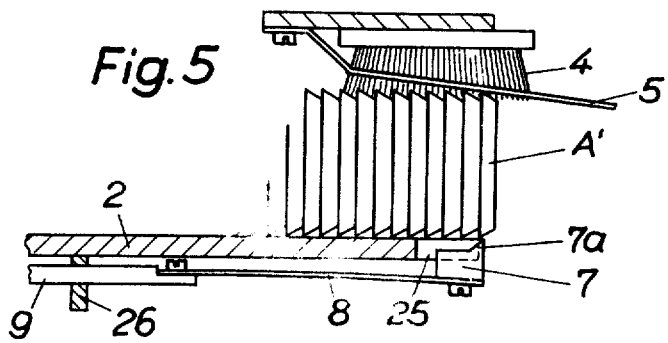
Figure 6:
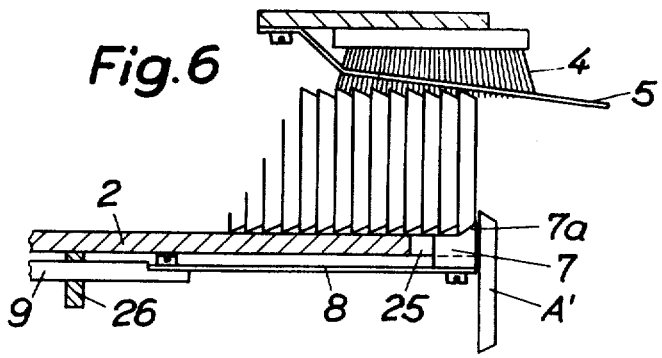
Figure 7:
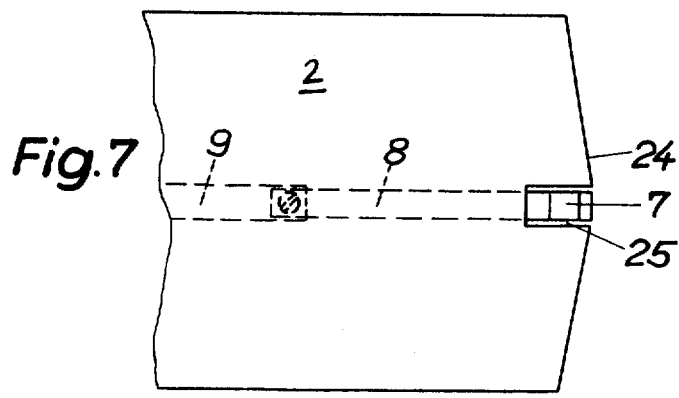
FIG. 7 is a top plan view of one component of the same embodiment.

Turning now to FIG. 7, there is shown the base plate 2 of the compacting channel 1, provided with a cutout 25 at the discharge end 24. Into the cutout 25 there projects a retaining member 7 having a wedge-shaped projection 7a. The member 7 is attached to one end of a leaf spring 8, the other end of which is secured to a carrier 9. The latter, in turn, is guided in rails 26 for displacement in the longitudinal direction of the compacting channel 1, as it may be observed in FIGS. 4, 5 and 6. As seen in FIG. 1, the carrier 9 is connected with a two-armed lever 10. To an actuating rod 12 connected to one end of the lever 10, there is imparted a reciprocating motion in the direction V, for example, by a contoured cam disc. As a result, the lever 10 executes an oscillating motion about pivot 11, resulting in a reciprocating motion of the members 7, 8 and 9. The contoured cam discs for driving the rods 12 and 27 as well as the sliding guide 18 are expediently arranged on a common shaft for coordinating the motions of the charging plate 6 and the retaining member 7 with one another. Thus, the carrier 9 and the retaining member 7 are periodically reciprocated back and forth. The motion of the retaining member 7 in the conveying direction of the compacting channel 1 is initiated at that moment in which the leading article A' starts its movement under the effect of the compacting stroke of the charging plate 6, so that the retaining member 7 continuously leads the first article A' and thereby the lower edge thereof is slightly pushed forwardly, as it may be observed in FIG. 4. The nose 7a of the retaining member 7 projecting beyond the base plate 2, at this time still firmly holds back the article A', although the latter is already beyond the terminus 24 of the base plate 2. In this manner the leading article A' is slightly separated from the remaining articles. The return motion of the retaining member 7 starts when the forward feed of the article series in the compacting channel 1 has stopped, that is, when the forward stroke of the charging plate is completed. The return motion of the retaining member 7 terminates before the subsequent compacting stroke of the charging plate 6 starts.

Figure 8:
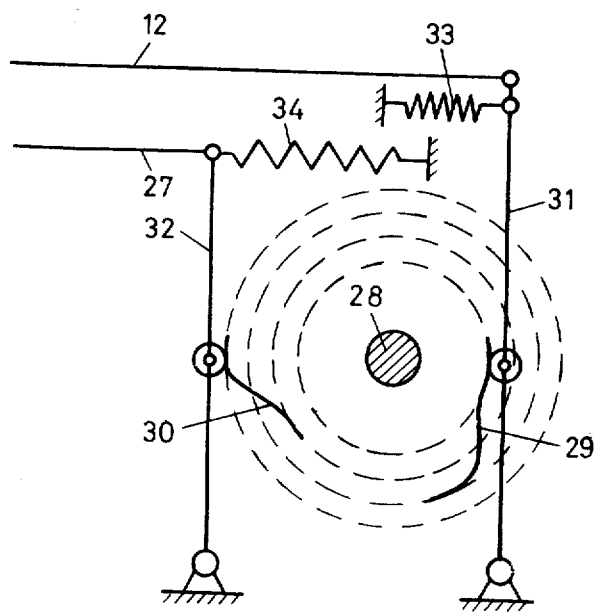
FIG. 8 is a schematic side elevational view illustrating a drive for components shown in FIGS. 1 and 2.

To accomplish the above-described timing between the motions of the charging plate 6 and the forward and backward motions of the retaining member 7, the respective driving cams, expediently mounted on a common drive shaft, are set at the proper phase angle to one another in a manner known by itself. In this connection reference is made to FIG. 8 which schematically illustrates such a cam drive. To a common drive shaft 28, which rotates counterclockwise as viewed in FIG. 8, there are affixed contoured cam discs 29 and 30 which, respectively, cooperate with a follower bar 31 (attached to the rod 12) and a follower bar 32 (attached to the rod 27). A spring 33 connected to the rod 12 and a spring 34 connected to the rod 27 oppose the leftward motion of the rods 12, 27 as effected by the cams 29 and 30, respectively. FIG. 8 depicts the moment when the rod 27 is at its maximum excursion (that is, the charging plate 6 has reached the end of its forward stroke) and the rod 12 is about to begin its movement towards the right (that is, the retaining member 7 is about to start its return motion). It is also feasible to use, instead of a cam drive, a hydraulic system to operate components 6 and 7. In such a system limit switches may be arranged to cooperate with the charging plate 6 for initiating the forward and the rearward motions of the retaining member 7.

During the return motion of the retaining member 7 (FIG. 5) the spring 8 is slightly bent downwardly so that the nose 7a is capable of moving under the lower edge of the leading article A' thus releasing the same. The resilient downward motion of the retaining member 7 during the return motion thereof is caused by the camming action between the lower edge of the leading article and the rearwardly sloping camming surface of the projection 7a of the retaining member 7. The brushes 4 and the leaf spring 5 hold the leading article A' firmly at the upper edge, so that it cannot topple prematurely from the compacting channel 1. As the retaining member 7 clears the leading article A' (FIG. 6), the latter, after an initial push by the spring 5, falls onto the chute 21 while the successive article is firmly retained by the nose 7a of the retaining member 7. The terminal edges 24 of the base plate 2 expediently have a swept-back configuration. The brush 4 disposed above the discharge end of the base plate 2 expediently projects horizontally beyond the terminal edges 24. The leaf spring 5 is expediently of a somewhat stiffer structure than the leaf spring 8 to which the insert 7 is secured.

It will be understood that the above description of the present invention is susceptible to various modifications, changes and adaptations, and the same are intended to be comprehended within the meaning and range of equivalents of the appended claims.

I claim:

1. In an apparatus for separately discharging articles, the apparatus including an at least approximately horizontal compacting channel having an inlet end, a discharge end and a base plate constituting the channel bottom; a charging plate disposed at the inlet end of the compacting channel for sequentially introducing articles into the compacting channel; means for moving the charging plate back and forth in the longitudinal direction of the compacting channel, the improvement comprising a retaining means situated at said discharge end for engaging the foremost article of an article series intermittently advanced in said compacting channel; and means for reciprocating said retaining means parallel to the longitudinal direction of said compacting channel in coordination with the motion of said charging plate for moving said retaining means in unison with said charging plate in the direction of article feed in said compacting channel.

2. An apparatus as defined in claim 1, wherein said base plate has a swept-back terminus at said discharge end of said compacting channel.

3. An apparatus as defined in claim 1, wherein said means for reciprocating said retaining means comprises means for initiating the motion of said retaining means in the direction of article feed upon introduction of an article into the compacting channel by said charging plate.

4. An apparatus as defined in claim 3, wherein said means for reciprocating said retaining means further comprises means for initiating a return motion of said retaining means immediately upon termination of the movement of said charging plate in the direction of article feed.

5. An apparatus as defined in claim 1, said retaining means including an upwardly extending wedge-shaped projection protruding beyond the surface of said base plate in the initial position and forward motion of said retaining means.

6. An apparatus as defined in claim 5, further comprising connecting means coupling said retaining means to said means for reciprocating said retaining means, said connecting means including a spring means for resiliently supporting said retaining means.

7. An apparatus as defined in claim 6, wherein said spring means is constituted by a leaf spring.

8. An apparatus as defined in claim 1, further comprising brush means for at least partially bounding said compacting channel at the sides and at the top.

9. An apparatus as defined in claim 8, wherein said brush means includes an upper brush bounding said compacting channel at its top and extending above and beyond a terminus of said base plate at said discharge end of said compacting channel.

10. An apparatus as defined in claim 8, further comprising spring means disposed vertically spaced from said base plate and extending beyond the zone of said discharge end for urging the articles against said base plate and for pushing a leading article, advanced beyond the terminus of said base plate at said discharge end, downwardly in a direction substantially normal to the length dimension of said base plate; said brush means including two juxtapositioned upper brushes bounding said compacting channel at its top and both extending above and beyond said terminus, said spring means being positioned between said two upper brushes.

11. An apparatus as defined in claim 1, further comprising spring means disposed vertically spaced from said base plate in and extending beyond the zone of said discharge end for urging the articles against said base plate and for pushing a leading article, advanced beyond the terminus of said base plate at said discharge end, downwardly in a direction substantially normal to the length dimension of said base plate.

12. An apparatus as defined in claim 11, further comprising connecting means coupling said retaining means to said means for reciprocating said retaining means, said connecting means including an additional spring means for resiliently supporting said retaining means, said spring means being more rigid than said additional spring means.

* * * * *